United States Patent
Wright et al.

(10) Patent No.: US 9,898,219 B1
(45) Date of Patent: Feb. 20, 2018

(54) ALLOCATING A DEVICE TO A CONTAINER

(71) Applicant: EMC Corporation, Hopkinton, MA (US)

(72) Inventors: Eron D. Wright, San Ramon, CA (US); Jimmy K. Seto, Andover, MA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 97 days.

(21) Appl. No.: 14/319,054

(22) Filed: Jun. 30, 2014

(51) Int. Cl.
*G06F 12/00* (2006.01)
*G06F 3/06* (2006.01)
*G06F 21/60* (2013.01)

(52) U.S. Cl.
CPC .......... *G06F 3/0631* (2013.01); *G06F 3/0604* (2013.01); *G06F 3/0683* (2013.01); *G06F 21/606* (2013.01)

(58) Field of Classification Search
CPC ...... G06F 13/16; G06F 13/4068; G06F 21/53; G06F 3/0622; G06F 3/0637; G06F 3/0673
See application file for complete search history.

(56) References Cited

U.S. PATENT DOCUMENTS

| | | | |
|---|---|---|---|
| 8,589,557 B1 | 11/2013 | Labat et al. | |
| 8,719,320 B1 | 5/2014 | Brooker et al. | |
| 2007/0124374 A1 | 5/2007 | Arun et al. | |
| 2013/0227568 A1 | 8/2013 | Anderson | |
| 2013/0239172 A1* | 9/2013 | Murakami | G06F 21/42 726/1 |
| 2013/0290543 A1 | 10/2013 | Lochhead et al. | |
| 2014/0325170 A1 | 10/2014 | Aswathanarayana et al. | |
| 2015/0301824 A1* | 10/2015 | Patton | G06F 8/71 717/122 |

OTHER PUBLICATIONS

Eron D. Wright, et al.; "Cluster Aware Container Manager," U.S. Appl. No. 14/319,348, filed Jun. 30, 2014 18 pages.
U.S. Appl. No. 14/319,648, filed Jun. 30, 2014 67 pages.
U.S. Non-Final Office Action dated Oct. 13, 2016 corresponding to U.S. Appl. No. 14/319,348; 21 Pages.
Response to Office Action dated Oct. 13, 2016 for U.S. Appl. No. 14/319,348; Response filed on Jan. 13, 2017; 7 Pages.

(Continued)

*Primary Examiner* — Yong Choe
(74) *Attorney, Agent, or Firm* — Daly, Crowley, Mofford & Durkee, LLP

(57) ABSTRACT

In one aspect, a method includes associating disk devices with containers based on a policy, allocating a disk device to a container based on the policy and allowing access to the disk device from the container. In another aspect, an apparatus includes electronic hardware circuitry configured to associate disk devices with containers based on a policy, allocate a disk device to a container based on the policy and allow access to the disk device from the container. In a further aspect, an article includes a non-transitory computer-readable medium that stores computer-executable instructions. The instructions cause a machine to associate disk devices with containers based on a policy, allocate a disk device to a container based on the policy and allow access to the disk device from the container.

19 Claims, 5 Drawing Sheets

(56) References Cited

OTHER PUBLICATIONS

U.S. Final Office Action dated Apr. 3, 2017 for U.S. Appl. No. 14/319,348; 22 Pages.
Request for Continued Examination filed on Jun. 30, 2017 for U.S. Appl. No. 14/319,348; 3 pages.
Amendment filed on Jun. 30, 2017 for U.S. Appl. No. 14/319,348; 8 pages.
Information Disclosure Statement filed on Jun. 30, 2017, for U.S. Appl. No. 14/319,348; 5 pages.

* cited by examiner

ALLOCATING A DEVICE TO A CONTAINER

BACKGROUND

Computer systems are constantly improving in terms of speed, reliability, and processing capability. As is known in the art, computer systems which process and store large amounts of data typically include a one or more processors in communication with a shared data storage system in which the data is stored. The data storage system may include one or more storage devices, usually of a fairly robust nature and useful for storage spanning various temporal requirements (e.g., disk drives). The one or more processors perform their respective operations using the storage system. Mass storage systems (MSS) typically include an array of a plurality of disks with on-board intelligent and communications electronics and software for making the data on the disks available.

Companies that sell data storage systems and the like are very concerned with providing customers with an efficient data storage solution that minimizes cost while meeting customer data storage needs. It would be beneficial for such companies to have a way for reducing the complexity of implementing data storage.

SUMMARY

In one aspect, a method includes associating disk devices with containers based on a policy, allocating a disk device to a container based on the policy and allowing access to the disk device from the container. In another aspect, an apparatus includes electronic hardware circuitry configured to associate disk devices with containers based on a policy, allocate a disk device to a container based on the policy and allow access to the disk device from the container. In a further aspect, an article includes a non-transitory computer-readable medium that stores computer-executable instructions. The instructions cause a machine to associate disk devices with containers based on a policy, allocate a disk device to a container based on the policy and allow access to the disk device from the container.

BRIEF DESCRIPTION OF THE DRAWINGS

Objects, features, and advantages of embodiments disclosed herein may be better understood by referring to the following description in conjunction with the accompanying drawings. The drawings are not meant to limit the scope of the claims included herewith. For clarity, not every element may be labeled in every figure. The drawings are not necessarily to scale, emphasis instead being placed upon illustrating embodiments, principles, and concepts.

Thus, features and advantages of the present disclosure will become more apparent from the following detailed description of exemplary embodiments thereof taken in conjunction with the accompanying drawings in which.

Like reference symbols in the various drawings indicate like elements.

DETAILED DESCRIPTION

In certain embodiments, the current disclosure may enable a distributed software control platform that allows enterprise IT departments and cloud service providers to convert heterogeneous storage systems within a data center into one large storage array. In some embodiments, the current disclosure may enable exposure of logical storage resources and allow enterprise IT departments and cloud service providers to manage heterogeneous storage environments through a simple, robust Representational State Transfer (REST) API and a command-line interface (CLI). In at least one embodiment, one API and one CLI may be used to connect to all the storage arrays in a data center as if they were one large storage array.

In some embodiments, the current disclosure may enable a software platform for multi-tenant environments that delivers a single logical, cloud-scale, geo-distributed storage system for developers and storage/cloud administrators. In certain embodiments, the current disclosure may enable an enterprise to adopt hybrid management models in environments where storage infrastructure resides in enterprise data centers, but is also hosted by a service provider or a public cloud. In certain embodiments, the current disclosure may enable an enterprise to manage hybrid deployments as a single storage array. In further embodiments, the current disclosure may enable a data storage system to scale to millions of storage volumes and file shares. In still further embodiments, the techniques and implementations described herein may be deployed as a vApp, a set of virtual machines.

In certain embodiments, the current disclosure may enable data-centric cloud infrastructures to be managed efficiently and flexibly through a data management software platform. In some embodiments, the current disclosure may simplify the management of complex, heterogeneous, geo-distributed storage resources by exposing the storage systems as logical resources through robust, easy-to-use REST API and CLI interfaces. In most embodiments, the current disclosure may provide integrations into cloud stacks such as VMWARE® and OPENSTACK®.

Generally, a data storage array or system may be one or more physical boxes or a cluster of physical boxes. In conventional systems, the data storage array or system may have one control path and one or more data paths. In typical systems, one or more data paths ports may provide data path access to the storage resources contained within the storage system. Typically, the protocols for the data path ports may be fiber channel, Internet Protocol (IP), iSCSI, NFS, or CIFS. Usually, to add more capacity to a data storage array or system, more physical disks, more inline cards, or more CPUs may be added to the data storage array or system. Conventionally, the data storage system or array may be a cluster of storage mediums. Typically, providing management for large numbers of data storage arrays or systems may be challenging.

Figure 1:
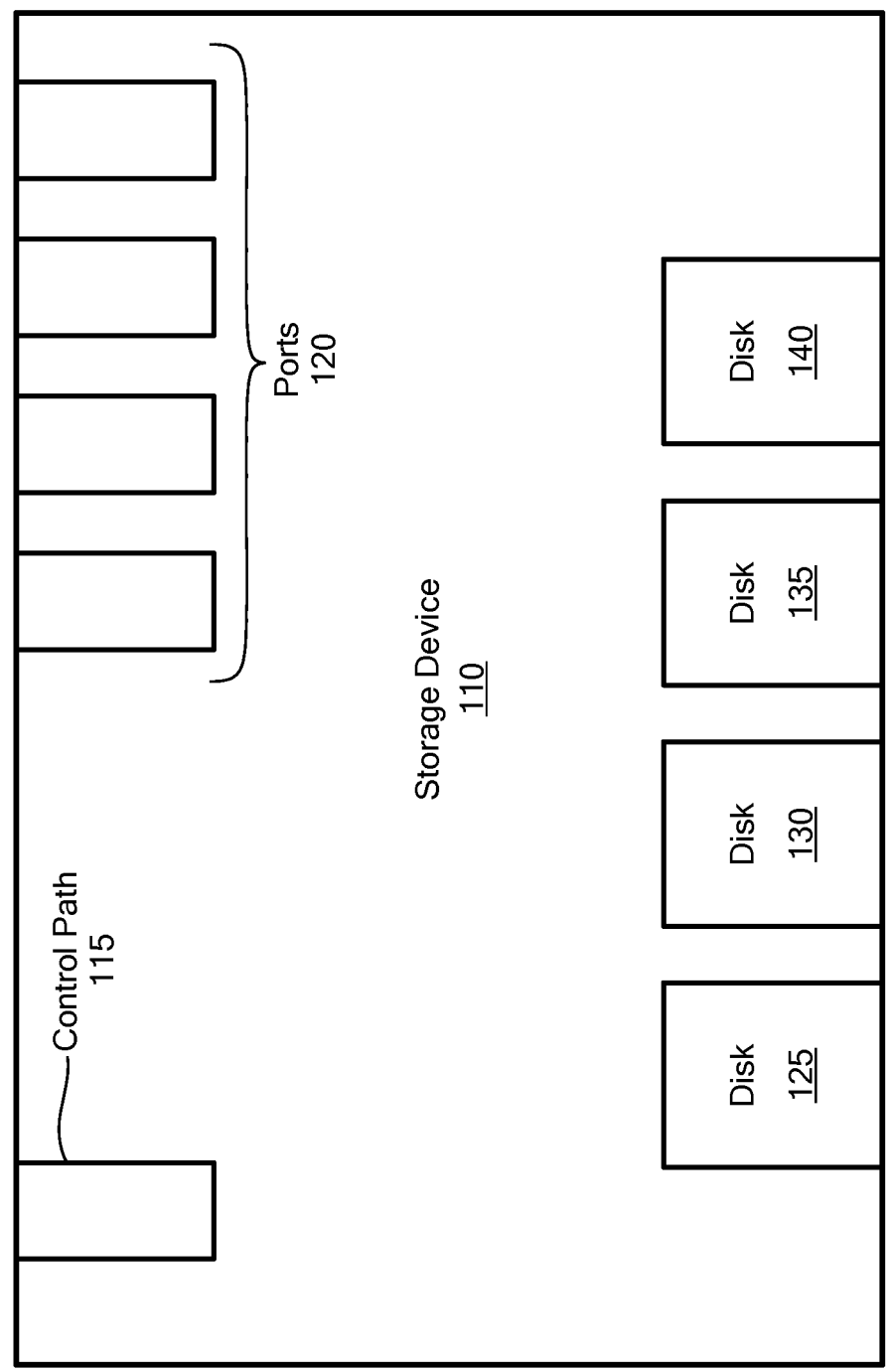
FIG. 1 is a simplified block diagram of an example of a data storage device.

Referring to FIG. 1, a storage device 110 includes a control path 115, ports 120, and disks 125, 130, 135 and 140. Control path 115 enables a user to interface with storage device 110. Control path 115 enables a user to access disks 125, 130, 135 and 140, via the services storage device 110 offers, through one or more of ports 120.

Figure 2:
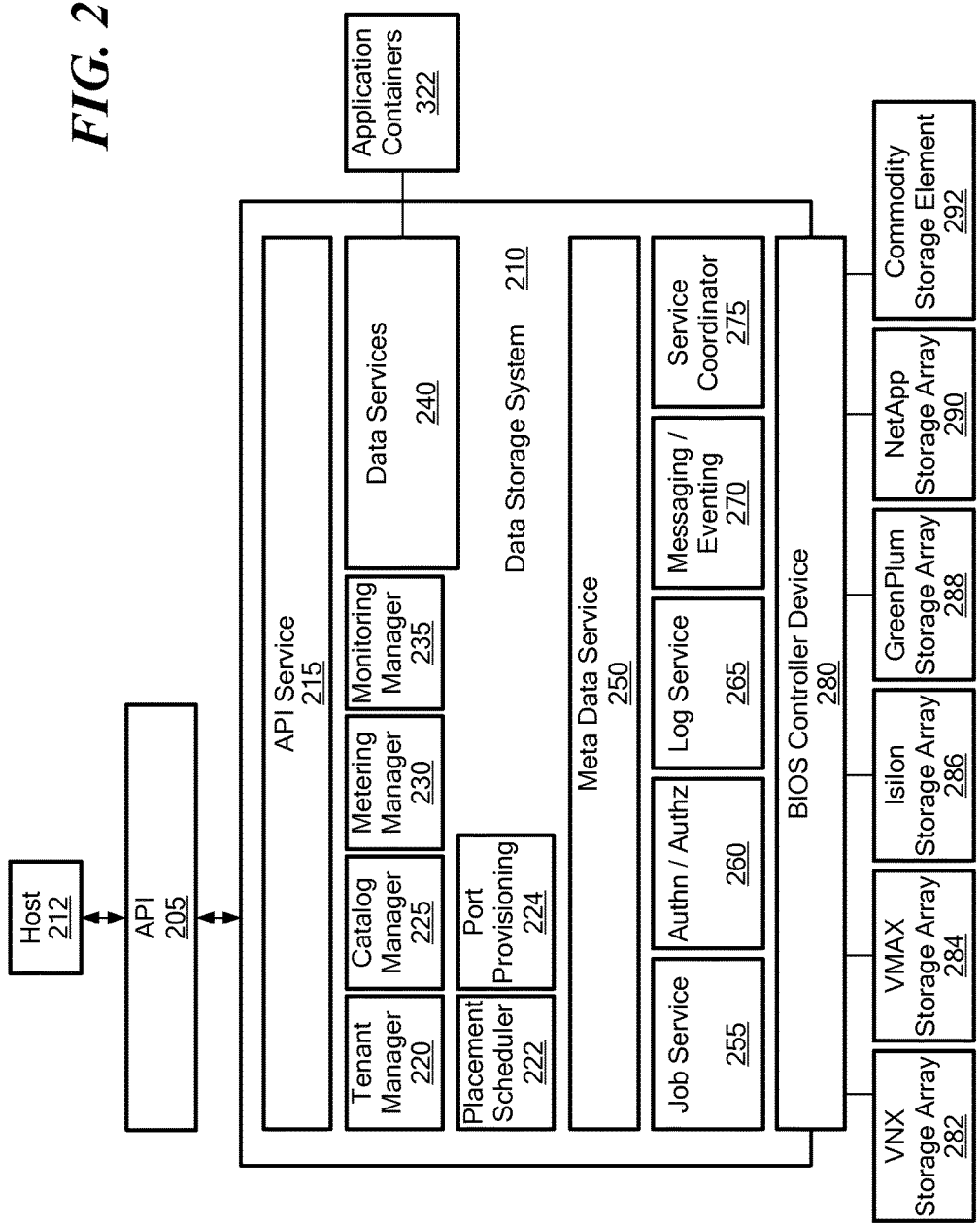
FIG. 2 is a simplified block diagram of an example of a data storage system.
Figure 3:
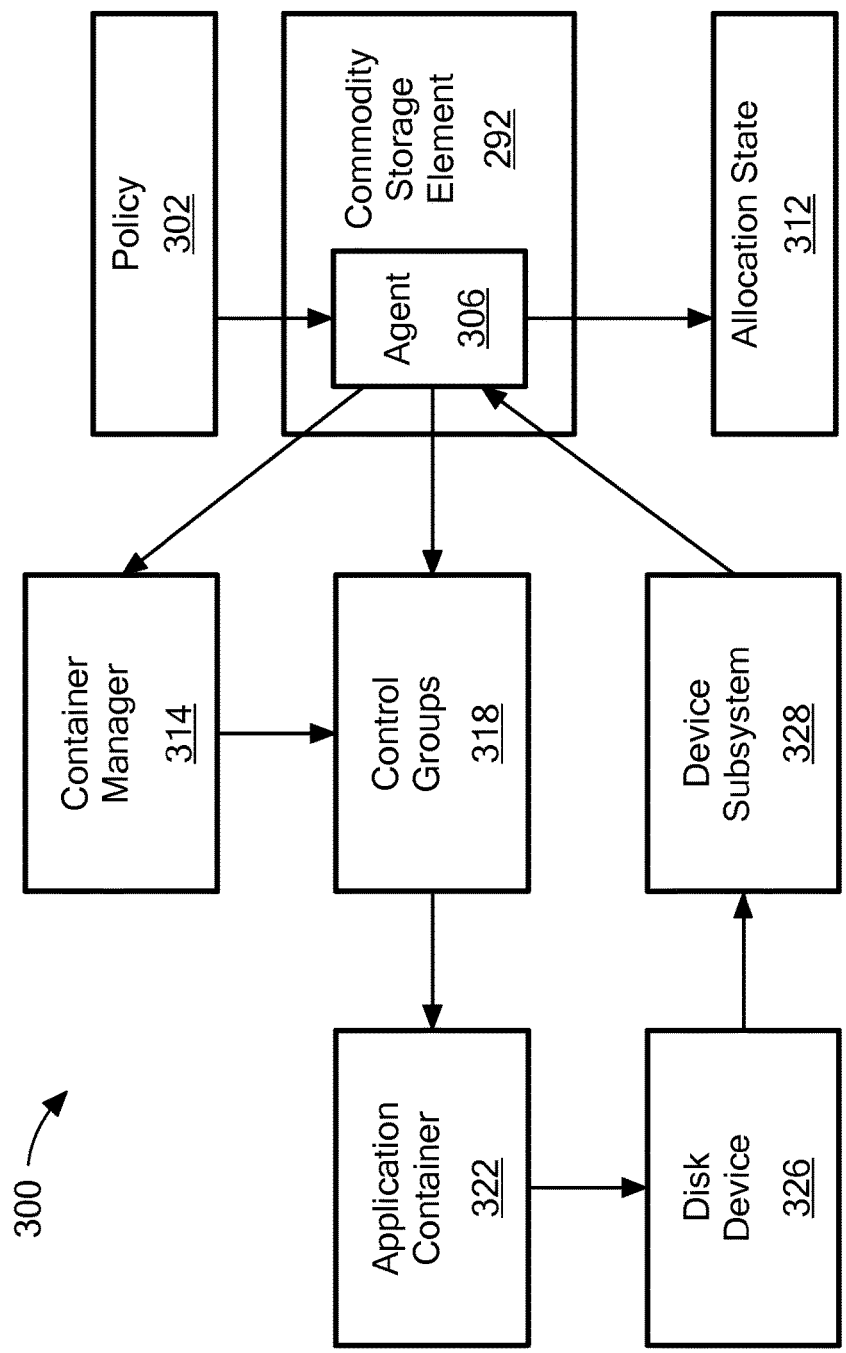
FIG. 3 is a simplified block diagram of components used to allocate a device to a container.

Referring to FIG. 2, API Service 215 enables external access to Host 212 through API 205. API Service 215 communicates requests to one big array, data storage system 210. API Service 215 enables access to Service Coordinator 275, which enables access to other services and management modules. Through Service Coordinator 275, API Service 215 has access to tenant manager 220, catalog manager 225, metering manager 230, monitoring manager 235, data services 240, meta data service 250, job service 255, authn/authz 260, log service 265, messaging/eventing 270, port provisioning 224, placement scheduler 222, and BIOS Controller Device 280. As shown, port provisioning 224 allocates data storage ports from data storage volumes allocated from attached data storage. In this embodiment, attached data storage includes VNX storage array 282, VMAX storage array 284, Isilon storage array 286, GreenPlum storage array 288, NetApp storage array 290, and commodity storage element 292. The JBOD/Commodity storage element 292 provides basic storage atop ordinary disks by deploying an agent 306 (FIG. 3). Basic storage is also provided by application containers 322 (FIG. 3). Commodity storage element 292 provides storage by deploying an application container that implements some storage semantic, such as "object" storage or "block" storage, writing data to disk devices on the local node in a manner appropriate to that form of storage. An agent 306 (FIG. 3) facilitates this by ensuring the correct application container(s) are deployed.

For the data storage system 210 device-level interaction is important. That is, the data storage system 210 manages disk devices, prepares the disk devices for use by an application, and manages which applications may access a given disk device.

However, existing container managers do not provide built-in functionality to allocate devices to containers. The techniques described herein enhance containers with granular access privileges to disk devices and enables each container to be granted access to specific disks based on application-specific considerations. In one example, the techniques described herein provide a more thoroughly-managed environment where numerous applications may execute side-by-side, without the potential for misuse of disk resources.

A container describes the dependencies of an application in terms of program files, frameworks (e.g., Java or Python), software libraries on which the application is dependent, configuration files, and other application-specific resources. A container may also describe the dependencies of an application in terms of network ports on which the application is providing service, information about how to start/stop the application, environment variables to configure the application and so forth. A key attribute of a container is that each container is an isolated, independently serviceable unit within a host. A container typically contains a single application or service, typically playing some role within a larger distributed system. For example, a Web application can be described as a container that combines custom developed code with the applications' dependencies.

Referring to FIG. 3, a block diagram 300 that describes how to allocate a device to a container includes a policy 302, an agent 306, an allocation state 312, a container manager 314, a control group 318, an application container 322, a disk device 326 and a device subsystem 328.

The policy 302 is defined by a user and establishes rules as to how disk resources should be allocated to application containers. The application containers 322 include pre-existing application containers on a host. The application containers include userspace code that receives access to the device subsystem 328.

The agent 306 is a system level agent operating in a high-privileged capacity (i.e., having privileged or root access to disk devices in the system, as opposed to the containers which have access to specific disk devices only, and none by default). The agent 306 is responsible for implementing the allocation state 312. The allocation state 312 is a structure containing the specific allocation of devices to containers for a given node. The agent 306 generates access control lists for the disk devices.

The container manager 314 manages the application containers. The container manager 314 provides a mechanism by which a system image of the application and its dependencies can be configured and packaged in a container. A container can then run on any host environment where the container manager 314 is installed. In one example, the container manager 314 is a container manager such as Docker by Docker, Inc.

The control groups 318 are each a collection of processes that are bound by the same criteria (i.e., a container). In one example, the control groups 318 are Linux control groups (cgroups), where each control group is a set of kernel objects (processes, mounts, net interfaces, and so forth) controlled as a unit.

The device subsystem 328 allows for discovery and control of disk devices and enforces the access control lists for the disk devices. In particular, the device subsystem 328 acts as a control/discovery component, as provided by the operating system, for dealing with individual disk devices (e.g., disk device 326). The application code interacts with the disk devices that are presented by the device subsystem 328, limited by the policy 302 as implemented by the agent 306. In one example, the device subsystem 328 is a Linux device subsystem.

Figure 4:
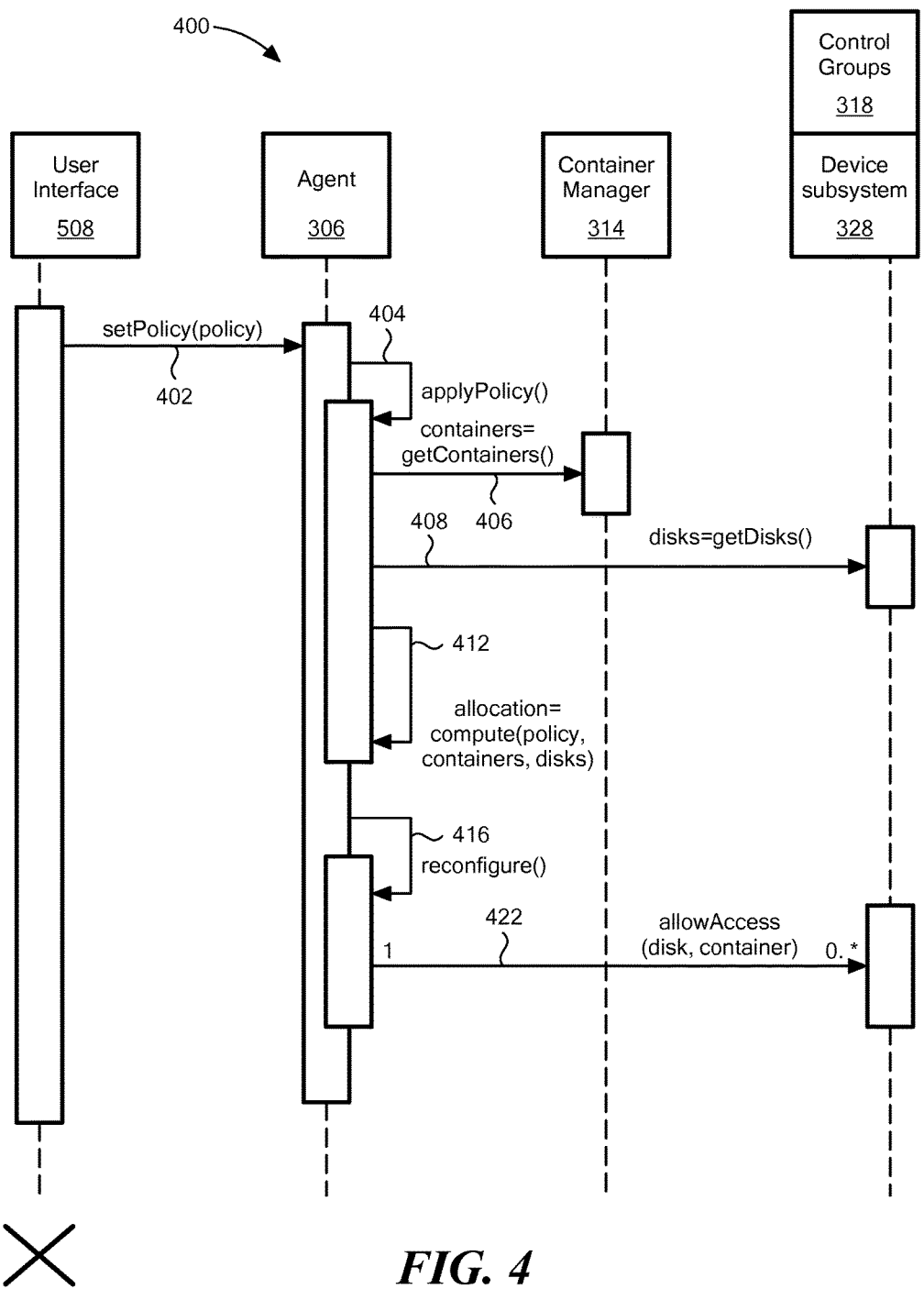
FIG. 4 is a simplified sequence diagram of an example of a process to allocate a device to a container.

Referring to FIGS. 3 and 4, an example of a process to allocate a device to a container is a process 400. Process 400 sets a policy (402). For example, a user, using a user interface 508 sets the policy 302.

Process 400 applies the policy 302 (404), obtains the containers (406) and obtains the disks (408). For example, the agent 306 applies the policy and based on the policy obtains the containers from the container manager 314 and devices (e.g., device 326) from the control group 318/device subsystem 328.

Process 400 allocates the containers and disks based on the policy (412). For example, the agent 306 allocates disk devices to the container following the rules in the policy.

Process 400 reconfigures the system (416) to allow access to the disk devices from the containers. For example, the agent 306 reconfigures the access control list for the disk device(s) so that specific containers may communicate with specific disk devices and allows the control groups 318/device subsystem 318 access to the disk device and container. The agent 306 performs a reconfiguration when the number of containers or disk devices changes after recalculating the effective allocation based on the policy.

Figure 5:
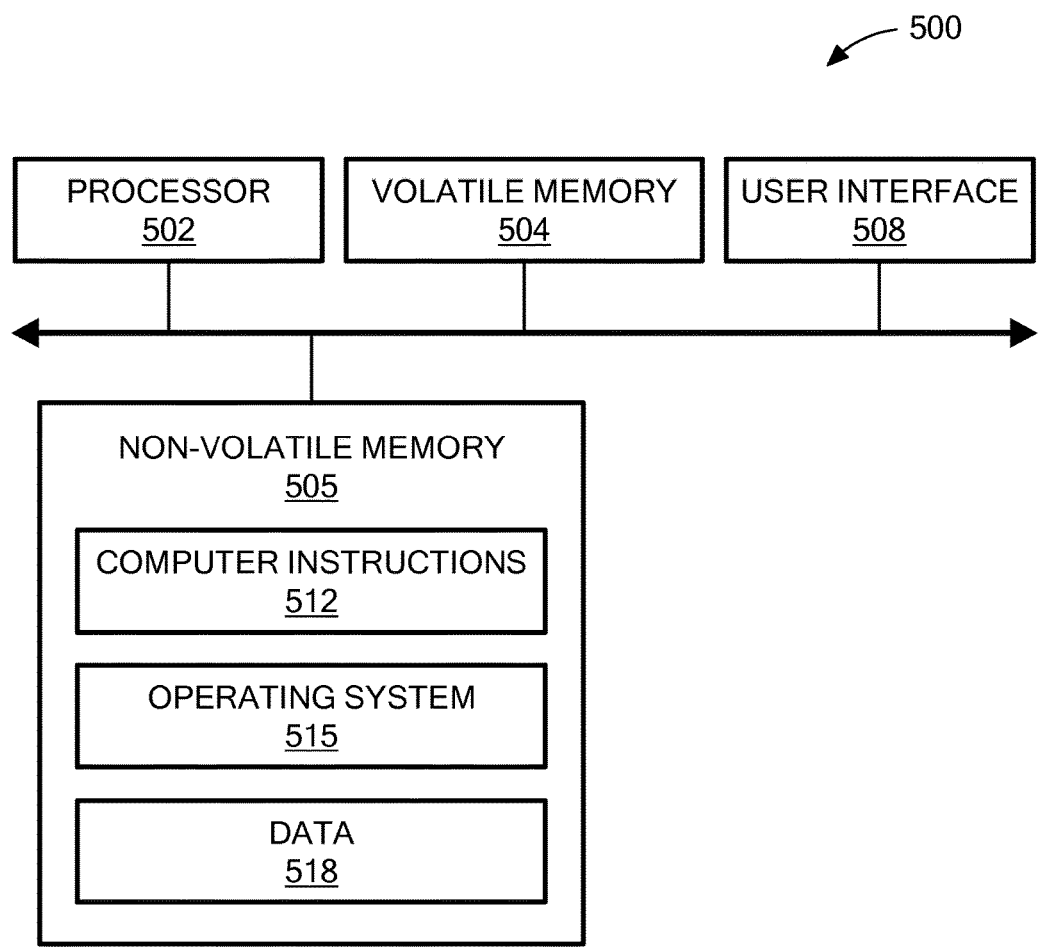
FIG. 5 is a simplified block diagram of an example of a computer on which any of the process of FIG. 4 may be implemented.

Referring to FIG. 5, a computer includes a processor 502, a volatile memory 504, a non-volatile memory 506 (e.g., hard disk) and the user interface (UI) 508 (e.g., a graphical user interface, a mouse, a keyboard, a display, touch screen and so forth). The non-volatile memory 506 stores computer instructions 512, an operating system 516 and data 518. In one example, the computer instructions 512 are executed by the processor 502 out of volatile memory 504 to perform all or part of the processes described herein (e.g., process 400).

The processes described herein (e.g., process 400) are not limited to use with the hardware and software of FIG. 5; they may find applicability in any computing or processing environment and with any type of machine or set of machines that is capable of running a computer program. The processes described herein may be implemented in hardware, software, or a combination of the two. The processes described herein may be implemented in computer programs executed on programmable computers/machines that each includes a processor, a non-transitory machine-readable medium or other article of manufacture that is readable by the processor (including volatile and non-volatile memory and/or storage elements), at least one input device, and one or more output devices. Program code may be applied to data entered using an input device to perform any of the processes described herein and to generate output information.

The system may be implemented, at least in part, via a computer program product, (e.g., in a non-transitory machine-readable storage medium such as, for example, a non-transitory computer-readable medium), for execution by, or to control the operation of, data processing apparatus (e.g., a programmable processor, a computer, or multiple computers)). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a non-transitory machine-readable medium that is readable by a general or special purpose programmable computer for configuring and operating the computer when the non-transitory machine-readable medium is read by the computer to perform the processes described herein. For example, the processes described herein may also be implemented as a non-transitory machine-readable storage medium, configured with a computer program, where upon execution, instructions in the computer program cause the computer to operate in accordance with the processes. A non-transitory machine-readable medium may include but is not limited to a hard drive, compact disc, flash memory, non-volatile memory, volatile memory, magnetic diskette and so forth but does not include a transitory signal per se.

The processes described herein are not limited to the specific examples described. For example, the process 400 is not limited to the specific processing order of FIG. 4. Rather, any of the processing blocks of FIG. 4 may be re-ordered, combined or removed, performed in parallel or in serial, as necessary, to achieve the results set forth above.

The processing blocks (for example, in the process 400) associated with implementing the system may be performed by one or more programmable processors executing one or more computer programs to perform the functions of the system. All or part of the system may be implemented as, special purpose logic circuitry (e.g., an FPGA (field-programmable gate array) and/or an ASIC (application-specific integrated circuit)). All or part of the system may be implemented using electronic hardware circuitry that include electronic devices such as, for example, at least one of a processor, a memory, a programmable logic device or a logic gate.

Elements of different embodiments described herein may be combined to form other embodiments not specifically set forth above. Other embodiments not specifically described herein are also within the scope of the following claims.

What is claimed is:

1. A method comprising:
configuring an agent to be a system level agent operating in a high-privileged capacity having access to a disk device;
configuring the agent to implement an allocation state comprising an allocation of the disk device to a container for a node;
associating disk devices with containers based on a policy;
allocating the disk device to the container based on the policy; and
allowing access to the disk device from the container using the agent.

2. The method of claim 1, further comprising performing a change of allocation between the containers and the disk devices when the number of the containers or the number of the disks devices changes.

3. The method of claim 1, wherein allowing access to the disk device from the container comprises allowing access to the disk device from the container using an agent in a commodity storage element.

4. The method of claim 3, further comprising receiving the policy at the agent from a user interface.

5. The method of claim 1 wherein allowing access to the disk device from the container includes changing an access control list for the disk device to allow the container to communicate with the disk device.

6. The method of claim 5 wherein the access control list determines which ones of the containers are allowed to communicate with which ones of the disk devices.

7. An apparatus, comprising:
electronic hardware circuitry configured to:
configure an agent to be a system level agent operating in a high-privileged capacity having access to a disk device;
configure the agent to implement an allocation state comprising an allocation of the disk device to a container for a node;
associate disk devices with containers based on a policy;
allocate the disk device to the container based on the policy; and
allow access to the disk device from the container using the agent.

8. The apparatus of claim 7, wherein the circuitry comprises at least one of a processor, a memory, a programmable logic device or a logic gate.

9. The apparatus of claim 7, wherein the circuitry configured to allow access to the disk device from the container comprises changing an access control list for the disk device to allow the container to communicate with the disk device.

10. The apparatus of claim 9, wherein the access control list determines which ones of the containers are allowed to communicate with which ones of the disk devices.

11. The apparatus of claim 7, further comprising circuitry configured to perform a change of allocation between the containers and the disk devices when the number of the containers or the number of the disks devices changes.

12. The apparatus of claim 7, wherein the circuitry configured to allow access to the disk device from the container comprises circuitry configured to allow access to the disk device from the container using the agent as an agent in a commodity storage element.

13. The apparatus of claim 12, further comprising circuitry configured to receive the policy at the agent from a user interface.

14. An article comprising:
a non-transitory computer-readable medium that stores computer-executable instructions, the instructions causing a machine to:
configure an agent to be a system level agent operating in a high-privileged capacity having access to a disk device;
configure the agent to implement an allocation state comprising an allocation of the disk device to a container for a node;
associate disk devices with containers based on a policy;
allocate the disk device to the container based on the policy; and
allow access to the disk device from the container using the agent.

15. The article of claim 14, wherein the instructions causing the machine to allow access to the disk device from the container comprises changing an access control list for the disk device to allow the container to communicate with the disk device.

16. The article of claim 15, wherein the access control list determines which ones of the containers are allowed to communicate with which ones of the disk devices.

17. The article of claim 14, further comprising instructions causing the machine to perform a change of allocation between the containers and the disk devices when the number of the containers or the number of the disks devices changes.

18. The article of claim 14, further comprising instructions causing the machine to receive the policy at the agent from a user interface.

19. The article of claim 14, wherein the instructions causing the machine to allow access to the disk device from the container comprises allowing access to the disk device from the container using the agent as an agent in a commodity storage element.

* * * * *